United States Patent
Sato et al.

(10) Patent No.: US 6,992,953 B2
(45) Date of Patent: Jan. 31, 2006

(54) TRACKING SERVO APPARATUS OF OPTICAL INFORMATION RECORDING AND REPRODUCING APPARATUS

(75) Inventors: Mitsuru Sato, Tsurugashima (JP); Junichi Furukawa, Tsurugashima (JP); Kazuo Takahashi, Tsurugashima (JP); Takanori Maeda, Tsurugashima (JP); Hiroshi Nishiwaki, Tsurugashima (JP); Takayuki Nomoto, Tsurugashima (JP); Ikuya Kikuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 416 days.

(21) Appl. No.: 09/813,898

(22) Filed: Mar. 22, 2001

(65) Prior Publication Data

US 2001/0040844 A1 Nov. 15, 2001

(30) Foreign Application Priority Data

Mar. 27, 2000 (JP) .......................... 2000-086532

(51) Int. Cl.
*G11B 7/095* (2006.01)

(52) U.S. Cl. .................................. 369/44.32; 369/44.36
(58) Field of Classification Search .............. 369/44.32, 369/44.35, 44.36, 53.22
See application file for complete search history.

(56) References Cited

U.S. PATENT DOCUMENTS

| | | | |
|---|---|---|---|
| 5,566,152 A | 10/1996 | Takamine et al. | ........ 369/44.28 |
| 6,185,176 B1 | 2/2001 | Sugiura et al. | |
| 6,510,111 B2 * | 1/2003 | Matsuura | ................. 369/44.32 |

FOREIGN PATENT DOCUMENTS

| | | |
|---|---|---|
| JP | 03-156736 | 7/1991 |
| JP | 09-050639 | 2/1997 |
| JP | 09-180209 | 7/1997 |
| JP | 10-320814 | 12/1998 |
| JP | 2000-076665 | 3/2000 |

* cited by examiner

*Primary Examiner*—Brian E. Miller
*Assistant Examiner*—Peter Vincent Agustin
(74) *Attorney, Agent, or Firm*—Morgan, Lewis & Bockius LLP

(57) ABSTRACT

A tracking servo apparatus in which reflection light obtained when a laser beam is irradiated onto a recording surface of an optical disc is photoelectrically converted, thereby obtaining a photoelectric conversion signal, a tracking error signal showing a deviation amount of an irradiating position of said laser beam for a track in a disc radial direction on the recording surface is generated by the photoelectric conversion signal, a spherical aberration occurring in an optical system is detected, a level of the tracking error signal is corrected on the basis of the detection result, and the irradiating position of the laser beam is moved in the disc radial direction in accordance with the level-corrected tracking error signal.

2 Claims, 6 Drawing Sheets

¹

TRACKING SERVO APPARATUS OF OPTICAL INFORMATION RECORDING AND REPRODUCING APPARATUS

BACKGROUND OF THE INVENTION

1. Field of the Invention

The invention relates to a tracking servo apparatus of an optical information recording and reproducing apparatus for recording and reproducing information to/from an optical disc.

2. Description of the Related Art

In an apparatus for recording or reproducing information to/from an optical disc, if a recording layer surface of the optical disc is directly exposed, the exposure causes problems. When the surface is scratched or damaged by a collision with a head, the recording or reproduction cannot be performed. The writing or reading, therefore, is performed through a transparent layer of a predetermined thickness. Although the transparent layer is formed by, for example, injection molding, it is difficult to accurately set a thickness of the transparent layer to a specified value for the whole surface. Usually, a thickness error of several tens of $\mu$m occurs.

The thickness error of the transparent layer causes the occurrence of a spherical aberration. Due to the occurrence of the spherical aberration, a salient deviation is caused between a focusing offset value which gives a maximum amplitude value of an RF signal as an information read signal and a focusing offset value which gives a maximum amplitude value of a tracking error signal. If a focusing offset value is, therefore, adjusted so as to maximize an amplitude of the tracking error signal, there is a problem such that a level of the maximum amplitude value of the RF signal decreases.

OBJECTS AND SUMMARY OF THE INVENTION

It is, therefore, an object of the invention to provide a tracking servo apparatus of an optical information recording and reproducing apparatus in which even if a spherical aberration is caused due to a thickness error of a transparent layer of an optical disc, a maximum amplitude value of a tracking error signal can be adjusted while preventing a reduction of a level of a maximum amplitude value of an RF signal.

According to the invention, there is provided a tracking servo apparatus of an optical information recording and reproducing apparatus for recording and reproducing information to/from an optical disc by irradiating a laser beam, comprising: an optical system for obtaining a photoelectric conversion signal by photoelectrically converting reflection light which is obtained when the laser beam is irradiated onto a recording surface of the optical disc; a tracking error signal generating portion for generating a tracking error signal indicative of a deviation amount of an irradiating position of the laser beam for a track in a disc radial direction on the recording surface by the photoelectric conversion signal; a spherical aberration detecting portion for detecting a spherical aberration occurring in the optical system; a level correcting portion for correcting a level of the tracking error signal on the basis of a detection result of the spherical aberration detecting portion; and a driving portion for moving the irradiating position of the laser beam in the disc radial direction in accordance with the tracking error signal, the level of which has been corrected by the level correcting portion.

According to the tracking servo apparatus of the invention, even if the spherical aberration is caused by a thickness error of the transparent layer of the optical disc, the amplitude fluctuation of the tracking error signal is corrected in accordance with a detection result of the spherical aberration, so that the tracking error signal can be set to a proper level while preventing the reduction of the maximum amplitude value of the RF signal.

DETAILED DESCRIPTION OF THE PREFERRED EMBODIMENT

An embodiment of the present invention will be described in detail hereinbelow with reference to the drawings.

Figure 1:
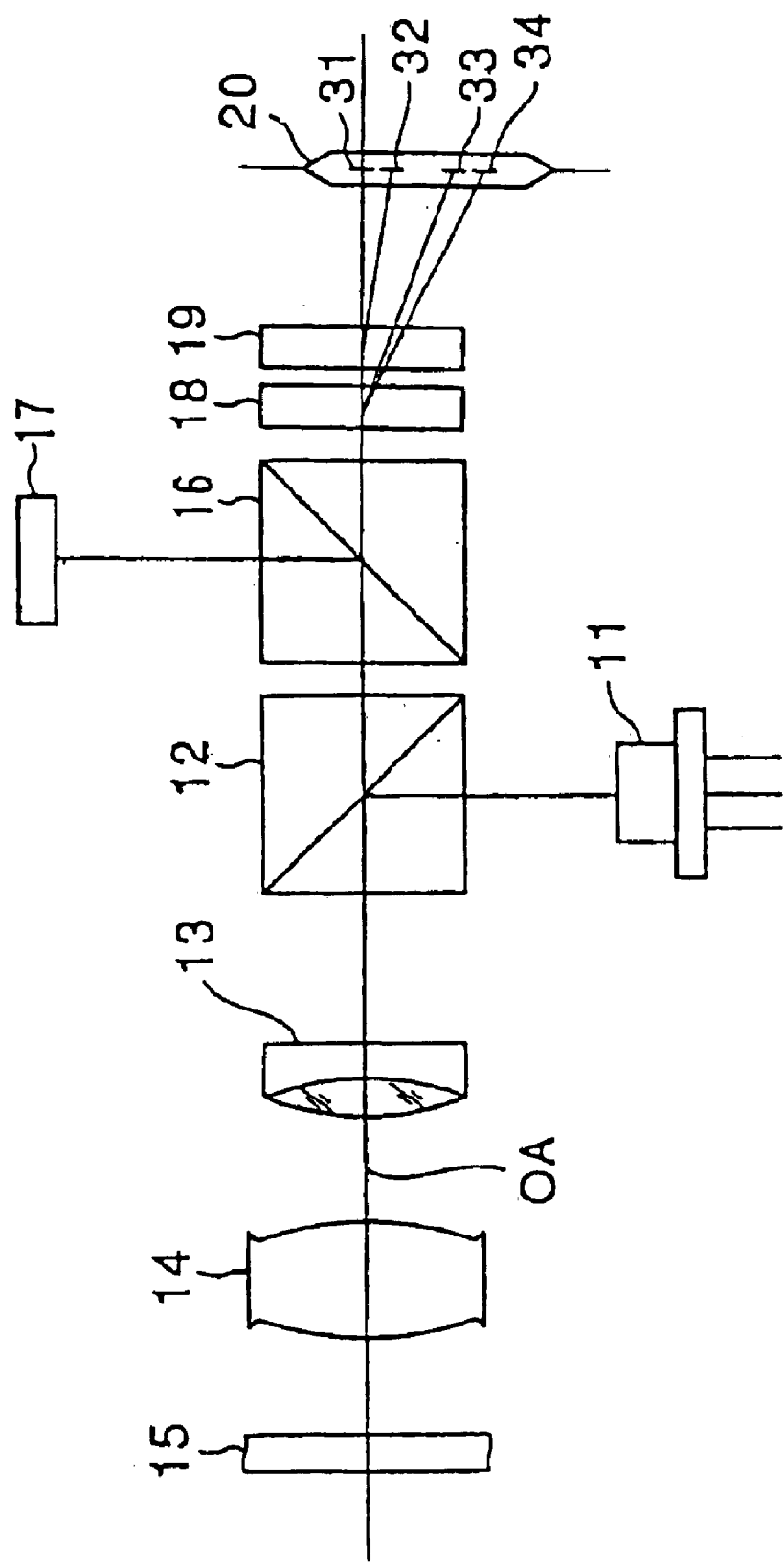
FIG. 1 is a diagram showing an optical system of an optical disc player to which a tracking servo apparatus according to the present invention is applied.

FIG. 1 shows an optical system of an optical disc player to which a tracking servo apparatus according to the present invention is applied. In the optical system, a light source 11 is driven by a driving circuit (not shown) and emits a laser beam. The laser beam emitted from the light source 11 is reflected in the direction of an optical axis OA on the side of an optical disc 15 by a beam splitter 12 and, thereafter, arrives as a parallel laser beam at an objective lens 14 through a collimator lens 13. The objective lens 14 converges the laser beam onto a recording surface of the optical disc 15. The laser beam reflected by the recording surface of the optical disc 15 is converted into the parallel laser beam by the collimator lens 13 and, thereafter, passes rectilinearly through the beam splitter 12, and enters a beam splitter 16. The beam splitter 16 not only reflects the incident laser beam in the vertical direction but also rectilinearly passes the incident laser beam, thereby branching the beam in two directions. The reflected laser beam arrives at the photosensitive surface of a photodetector 17. The other passing laser beam reaches a hologram device 18. A hologram device 19 is further continuously arranged after the hologram device 18. The laser beam passed through the two hologram devices 18 and 19 reaches a photosensor 20. The objective lens 14, collimator lens 13, beam splitter 12, and hologram devices 18 and 19 are arranged so that the optical axis OA passes the centers of them.

Figure 2:
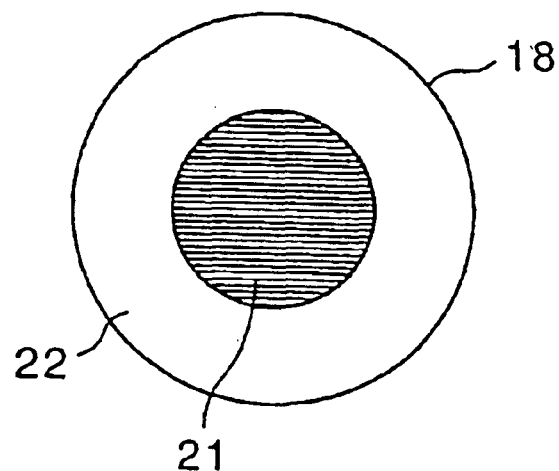
FIG. 2 is a diagram showing a pattern of a hologram device 18 in the optical system of FIG. 1.

When the hologram device 18 is seen from the optical axis OA direction, it has a circular outer shape as shown in FIG. 2 and a circular hologram pattern 21 is formed in the center portion. The hologram pattern 21 is formed inside smaller than an outer peripheral portion 22 corresponding to an effective optical path so as to diffract the laser beam at a predetermined angle. The pattern 21 has straight lines and a blaze-shaped surface so as to concentrate a diffraction light energy in a specific direction. The portion of the hologram pattern 21 is formed in a manner such that the reflection light of the laser beam which was passed through an area whose numerical aperture NA on the objective lens 14 is equal to or less than 0.31 and irradiated onto the optical disc 15 is transmitted. The outer peripheral portion 22 is formed in a manner such that the reflection light of the laser beam which was passed through an area whose numerical aperture NA on the objective lens 14 is equal to or less than 0.85 and irradiated onto the optical disc 15 is transmitted.

Figure 3:
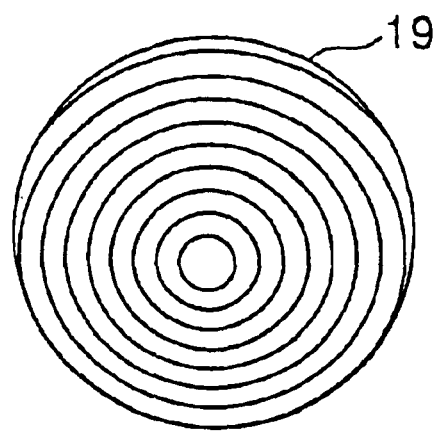
FIG. 3 is a diagram showing a pattern of a hologram device 19 in the optical system of FIG. 1.

The hologram device 19 has a circular outer shape as shown in FIG. 3. when the hologram device 19 is seen from the optical axis OA direction and has a concentric pattern in which a point that is decentered from the center point of the circle is set to a center point and functions as a concave lens. The hologram device 19 separately outputs two laser beams which have different focal positions toward the photosensor 20.

Figure 4:
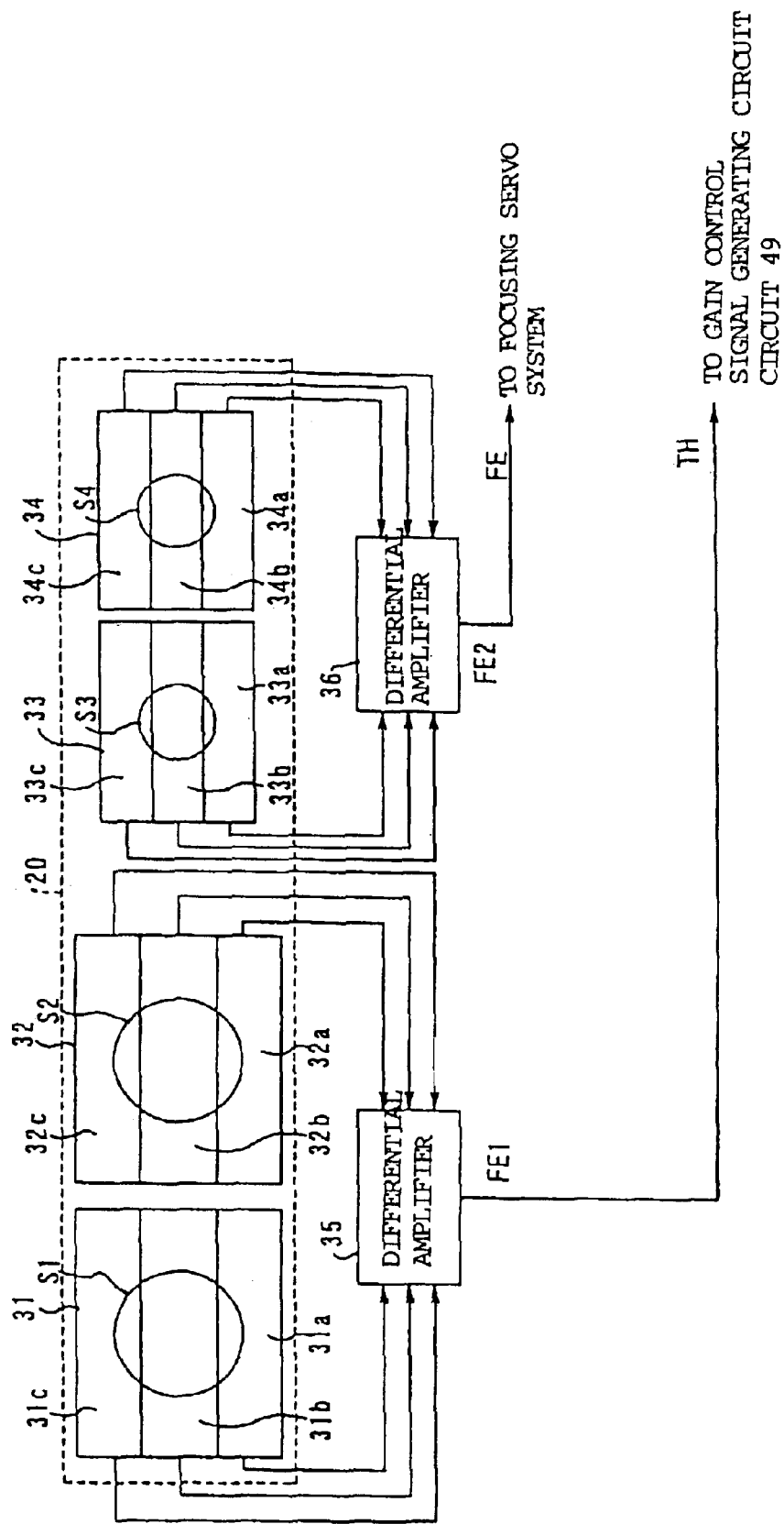
FIG. 4 is a block diagram showing a circuit construction of a pickup portion in FIG. 1.

The photosensor 20 is arranged at an almost intermediate position of the different focal positions of the two laser beams separated by the hologram device 19 and has four photodetectors 31 to 34. The photodetectors 31 to 34 are arranged on a plane perpendicular to the optical axis OA. The photodetector 31 is located on the optical axis OA. The other photodetectors 32 to 34 are arranged so as to be spaced away from the optical axis OA in the same direction in that order. As shown in FIG. 4, the photosensitive surface of each of the photodetectors 31 to 34 is divided into three areas by the dividing lines extended in the arranging direction, so that an output of each of the three divided areas is obtained.

A differential amplifier 35 is connected to 3-split photo-detecting elements 31$a$ to 31$c$ of the photodetector 31 and 3-split photodetecting elements 32$a$ to 32$c$ of the photodetector 32. A differential amplifier 36 is connected to 3-split photodetecting elements 33$a$ to 33$c$ of the photodetector 33 and 3-split photodetecting elements 34$a$ to 34$c$ of the photodetector 34. The differential amplifier 35 generates a first error signal FE1 and the differential amplifier 36 generates a second error signal FE2. The first error signal FE1 becomes a thickness error signal TH of a transparent layer of the disc 15. The second error signal FE2 is supplied as a focusing error signal FE to a focusing servo system (not shown) of the optical disc player.

Figure 5:
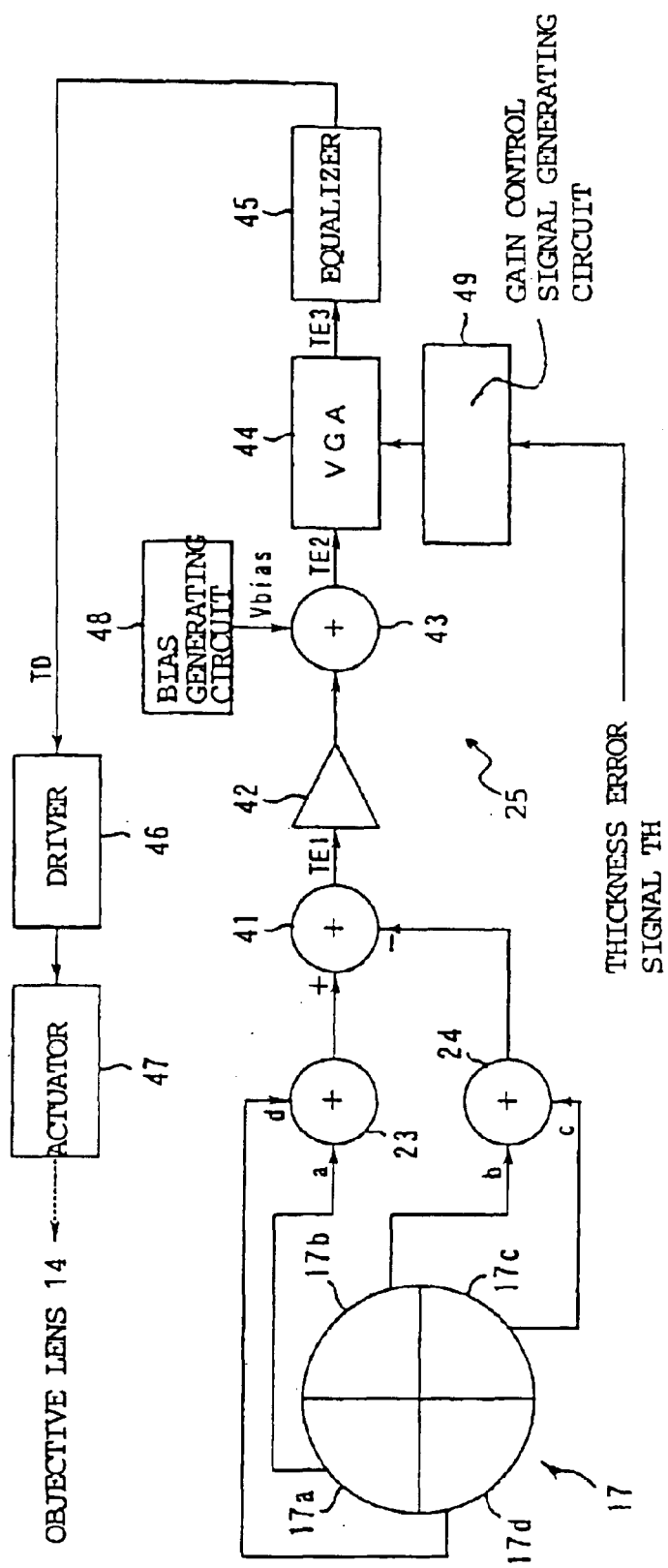
FIG. 5 is a block diagram showing a construction of the tracking servo apparatus.

As shown in FIG. 5, the photosensitive surface of the photodetector 17 is divided into four areas by a dividing line in the disc radial direction and a dividing line in the tangential direction of the tracks. The photosensitive surfaces are constructed by photodetecting elements 17$a$ to 17$d$. Output signals of the photodetecting elements 17$a$ to 17$d$ are assumed to be a, b, c, and d, respectively. Sum signals (a+d) and (b+c) of the output signals of every two photodetecting elements existing at the symmetrical positions by the dividing lines in the tangential direction of the photosensitive surfaces of the photodetecting elements 17$a$ to 17$d$ are calculated by adders 23 and 24, respectively. A tracking servo unit 25 is connected to an output of each of the adders 23 and 24.

The tracking servo unit 25 has a subtracter 41, an amplifier 42, an adder 43, a VGA (voltage gain amplifier) 44, and an equalizer 45. The subtractor 41 generates a tracking error signal TE1 by subtracting the output signal (b+c) of the adder 24 from the output signal (a+d) of the adder 23. An output of the subtractor 41 is connected to one input of the adder 43 through the amplifier 42. A bias generating circuit 48 is connected to the other input of the adder 43. The bias generating circuit 48 supplies a bias voltage Vbias to another input of the adder 43 in order to remove a DC (direct current) offset component Voffset included in the output signal of the amplifier 42. The generation of the bias voltage Vbias is controlled by a microcomputer (not shown).

The VGA 44 is connected to an output of the adder 43. The VGA 44 adjusts a level of a tracking error signal TE2 obtained after the removal of the offset component Voffset in order to compensate a spherical aberration. A gain control signal generating circuit 49 is connected to a control terminal of the VGA 44. The thickness error signal TH is supplied from the differential amplifier 35 to the gain control signal generating circuit 49. The gain control signal generating circuit 49 folds back the thickness error signal TH on the basis of a predetermined reference level, generates a gain control signal, and supplies the gain control signal to the VGA 44.

An output signal of the VGA 44 is phase-compensated by the equalizer 45. A signal obtained after the phase compensation is supplied as a tracking drive signal TD to a driver 46. The driver 46 drives a tracking actuator 47 in a pickup in response to an output signal of the equalizer 45, thereby moving the objective lens 14 in the disc radial direction.

In the above construction, the laser beam reflected by the recording surface of the optical disc 15 rectilinearly passes through the objective lens 14 and collimator lens 13, goes straight in the beam splitters 12 and 16, and reaches the hologram device 18. The light which becomes transmission light (0th-order diffraction light) as it is in the optical axis OA direction without being diffracted by the hologram pattern 21 and the light which becomes primary diffraction light by the diffraction by the hologram pattern 21 are derived from the incident light to the hologram device 18.

With respect to the transmission light from the hologram device 18 to the hologram device 19, the hologram device 19 outputs the transmission light as it is, allows a spot S1 based on the transmission light to be formed on the photosensitive surface of the photodetector 31. The hologram device 19 further generates primary diffraction light, and allows a spot S2 based on the primary diffraction light to be formed on the photosensitive surface of the photodetector 32. With respect to the primary diffraction light from the hologram device 18 to the hologram device 19, the hologram device 19 generates the light as it is as transmission light, and allows a spot S3 based on the transmission light to be formed on the photosensitive surface of the photodetector 33. The hologram device 19 generates the light as further primary diffraction light, and allows a spot S4 based on the further primary diffraction light to be formed on the photosensitive surface of the photodetector 34.

When the spherical aberration of the irradiation light to the optical disc 15 is small and the light is in an in-focus state, diameters of spots formed on the photodetectors 31 and 32 are almost equal, and diameters of spots formed on the photodetectors 33 and 34 are almost equal.

In the differential amplifier 35, therefore, the first error signal FE1 is generated in accordance with output levels of the photodetecting elements 31$a$ to 31$c$ of the photodetector 31 and those of the photodetecting elements 32$a$ to 32$c$ of the photodetector 32. When the output levels of the photodetecting elements 31$a$ to 31$c$ are assumed to be 31$a$OUT to 31$c$OUT and the output levels of the photodetecting elements 32$a$ to 32$c$ are assumed to be 32$a$OUT to 32$c$OUT, respectively, the first error signal FE1 can be expressed as shown by the following equation (1).

$$FE1=(31a\text{OUT}+31c\text{OUT}-31b\text{OUT})-(32a\text{OUT}+32c\text{OUT}-32b\text{OUT}) \quad (1)$$

In the differential amplifier 36, the second error signal FE2 is generated in accordance with output levels of the photodetecting elements 33a to 33c of the photodetector 33 and those of the photodetecting elements 34a to 34c of the photodetector 34. When output levels of the photodetecting elements 33a to 33c are assumed to be 33aOUT to 33cOUT and output levels of the photodetecting elements 34a to 34c are assumed to be 34aOUT to 34cOUT, respectively, the second error signal FE2 can be expressed as shown by the following equation (2).

$$FE2=(33a\text{OUT}+33c\text{OUT}-33b\text{OUT})-(34a\text{OUT}+34c\text{OUT}-34b\text{OUT}) \quad (2)$$

The first error signal FE1 becomes the thickness error signal TH when the second error signal FE2 is set to 0.

Figure 6:
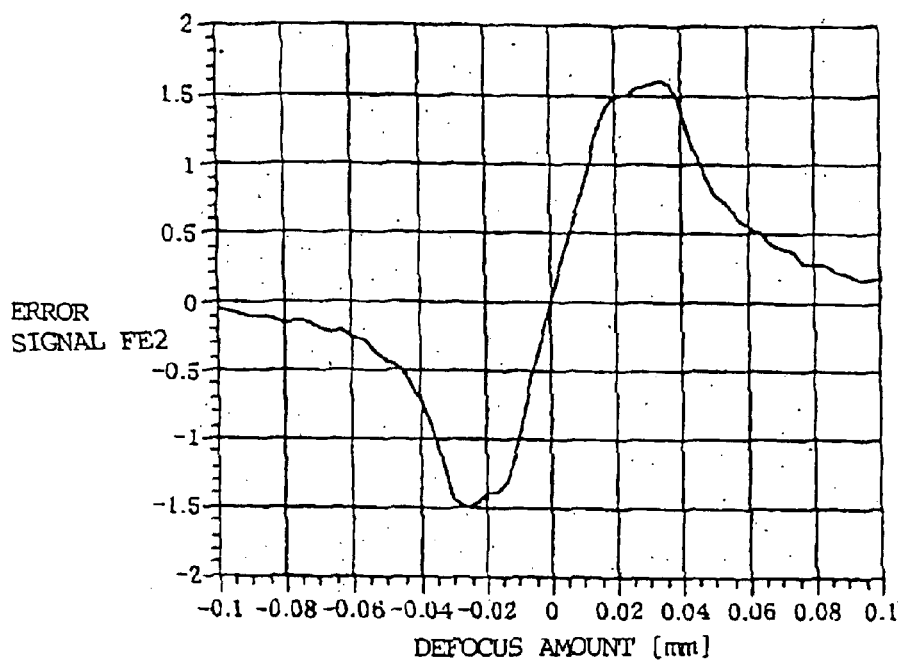
FIG. 6 is a diagram showing a signal change in a second error signal FE2.
Figure 7:
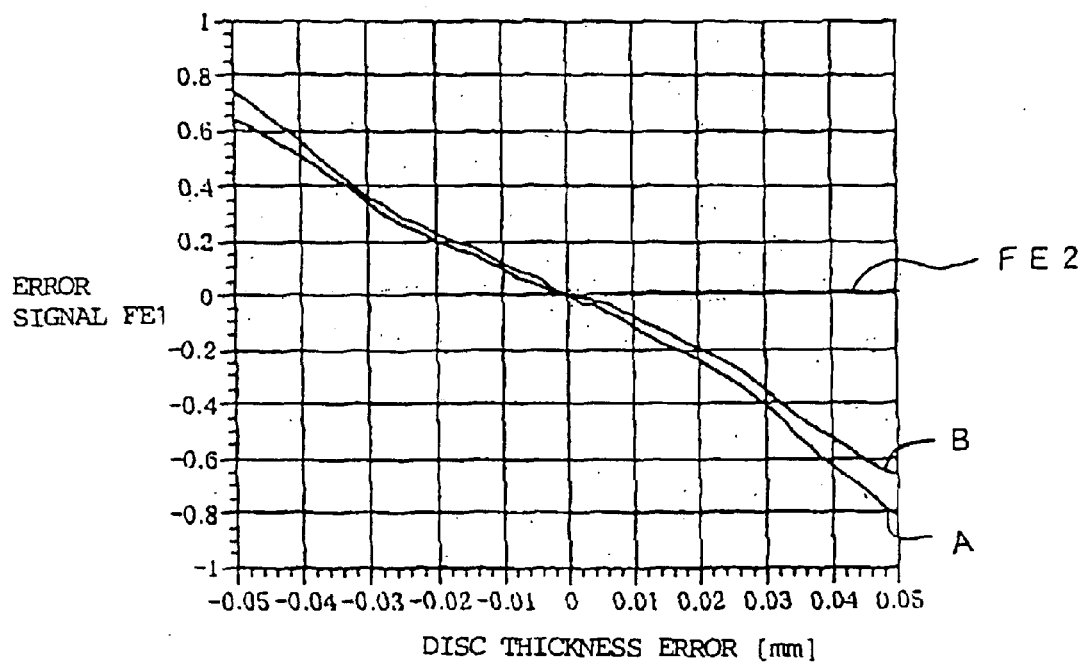
FIG. 7 is a diagram showing a signal change in a first error signal FE1.

FIG. 6 shows a signal change in the second error signal FE2 for a defocus amount when the thickness of transparent layer of the optical disc 15 is equal to a specified thickness. FIG. 7 shows a signal change in first error signal FE1 for a thickness error of the transparent layer of the optical disc 15 when the focusing servo system is operated in accordance with the second error signal FE2, that is, in a just focusing state. Although the second error signal FE2 is controlled to almost 0 in FIG. 7, the first error signal FE1 changes in accordance with the thickness error of the transparent layer. When the second error signal FE2 is controlled to almost 0, therefore, the thickness error signal TH which is calculated from the equation (2) is almost proportional to the first error signal FE1. Thus, the signal TH shows a thickness error of the transparent layer of the optical disc 15. In FIG. 7, a characteristics A denote the signal change in first error signal FE1 based on an output of the photodetector 31 from the outer peripheral portion 22 in the case where the light is almost diffracted by the hologram pattern 21 of the hologram device 18, and a characteristics B show a signal change in first error signal FE1 based on the output of the photodetector 31 which received the light from both of the hologram pattern 21 and the outer peripheral portion 22.

The reflection beam which rectilinearly passes through the beam splitter 12 not only rectilinearly passes in the beam splitter 16 but also is reflected by the beam splitter 16, arrives at the photosensitive surface of the photodetector 17, and forms a light spot. In accordance with the output signals a to d of the photodetecting elements 17a to 17d constructing the photodetector 17, the tracking error signal TE1 is generated by the adders 23 and 24 and subtractor 41. That is, TE1=(a+d)−(b+c) is obtained from the output of the subtractor 41. The tracking error signal TE1 is amplified by the amplifier 42 and, thereafter, it is added to the bias voltage Vbias by the adder 43 and becomes a tracking error signal TE2.

Figure 8A:
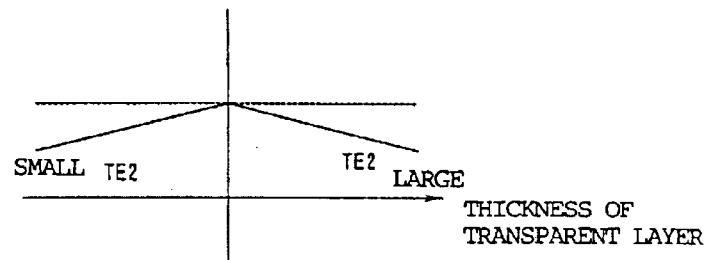
FIGS. 8A and 8B are diagrams showing a level correction of a tracking error signal.

There is a relation as shown in FIG. 8A between the tracking error signal TE2 obtained as mentioned above and the thickness of transparent layer of the optical disc under predetermined disc recording conditions. The tracking error signal TE2 becomes maximum when the thickness of transparent layer of the optical disc is equal to a specified thickness (for example, 0.6 mm) and is smaller when the thickness is larger or smaller than the specified thickness.

Figure 8B:
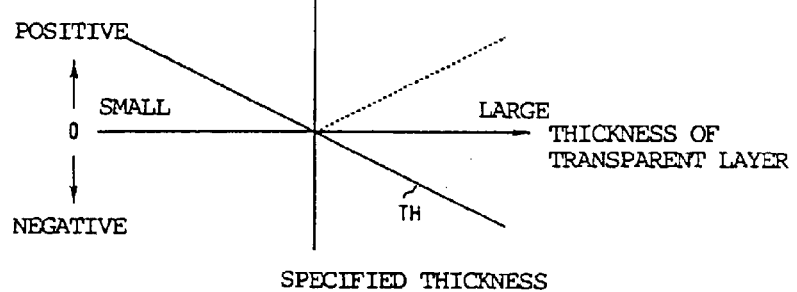

The thickness error signal TH changes as shown by a solid line in FIG. 8B for the thickness of transparent layer of the optical disc. That is, when the thickness of transparent layer of the optical disc is smaller than the specified thickness, the thickness error signal TH is set to a positive voltage and increases in proportion to the thickness of transparent layer. when the thickness of transparent layer of the optical disc is larger than the specified thickness, the thickness error signal TH is set to a negative voltage and decreases in proportion to the thickness of transparent layer. The negative voltage of the thickness error signal TH is inverted to the positive voltage as shown by a dotted line in FIG. 8B by the gain control signal generating circuit 49 and generated. In the case, a predetermined fold-back reference value is set to 0. The positive voltage of the thickness error signal TH is generated as it is to the gain control signal generating circuit 49. As mentioned above, the signal TH which is generated from the gain control signal generating circuit 49 is the gain control signal.

Since the gain control signal controls a gain of the VGA 44, the tracking error signal TE2 is amplified as the thickness of transparent layer of the optical disc 15 is larger or smaller than the specified thickness. That is, even if the thickness of transparent layer of the optical disc 15 has an error for the specified thickness, the VGA 44 amplifies the tracking error signal TE2 by the gain corresponding to the error. An amplitude variation of the tracking error signal due to the spherical aberration that is caused by the thickness error of the transparent layer of the optical disc 15 is, therefore, corrected and can be set to the proper level as shown by a dotted line in FIG. 8A.

A tracking error signal TE3 of which gain was controlled by the VGA 44 is phase-compensated by the equalizer 45. The phase-compensated signal is supplied as a tracking drive signal TD to the driver 46. The driver 46 moves the objective lens 14 in the disc radial direction through the tracking actuator 47 in accordance with the tracking drive signal TD. Even if the thickness of transparent layer of the optical disc 15 has an error for the specified thickness as mentioned above, the level of the tracking error signal TE3 is properly controlled. Thus, the tracking drive signal TD is also set to the proper level on the basis of the tracking error signal TE3. The irradiating position of the laser beam which is irradiated onto the track on the optical disc 15, therefore, can maintain a high-quality level of tracking performance.

The spherical aberration detecting means for obtaining a spherical aberration signal corresponding to the spherical aberration amount on the basis of the thickness of transparent layer at the irradiating position of the laser beam is not limited to the construction in the embodiment mentioned above. Although a method of measuring the spot diameters by the 3-split photodetectors has been used as a method of generating each error signal in the embodiment, the invention is not limited to this method. For example, the error signals can be also generated by forming the hologram device 19 in a shape adapted for giving an astigmatism and giving the astigmatism to the passing light. It is also possible to generate the error signals FE1 and FE2 by using the conventional method of detecting the diameter of each of the spots according to different numerical apertures by the 3-split photodetectors without using the hologram device 19.

Although the laser beam is divided into two areas when the reflection light from the disc 15 passes through the hologram device 18 in the embodiment, in place of the construction, a device that is substantially equivalent to the hologram device 18 can be also provided on one of the surfaces of the objective lens or so as to be driven together with the objective lens. In the case where the means for dividing the laser beam into two areas such as a hologram device 18 is arranged on the optical path where the irradiation light onto the disc and the reflection light therefrom pass, by using a polarizing hologram showing an effect on a polarization component in a specific direction together with a wavelength plate, a light amount loss occurring on the optical path of the irradiation light can be suppressed.

Although the hologram devices 18 and 19 are individually provided in the embodiment, by integrating the patterns, they can be provided as a single device.

Further, although the level of the tracking error signal due to the spherical aberration that is caused by the thickness error of the transparent layer of the optical disc 15 is corrected by the proportional relation in the embodiment, the level correction of the tracking error signal due to the thickness error of the transparent layer of the optical disc 15 is not limited to the proportional relation.

As mentioned above, according to the tracking servo apparatus of the invention, even if the spherical aberration is caused by the thickness error of the transparent layer of the optical disc, the amplitude fluctuation of the tracking error signal is corrected without reducing the maximum amplitude level of the RF signal and can be set to the proper level. The deterioration of the information writing precision and information reading precision due to the occurrence of the spherical aberration can be, consequently, prevented.

What is claimed is:

1. A tracking servo apparatus of an optical information recording and reproducing apparatus for recording and reproducing information by irradiating a laser beam onto an optical disc, comprising:

an optical system for obtaining a photoelectric conversion signal by photoelectrically converting reflection light which is obtained when said laser beam is irradiated onto a recording surface of said optical disc;

a tracking error signal generating portion for generating a tracking error signal indicative of a deviation amount of an irradiating position of said laser beam for a track in a disc radial direction on said recording surface by said photoelectric conversion signal;

a spherical aberration detecting portion for detecting a spherical aberration caused by a thickness error of a transparent layer of the optical disc;

a level correcting portion for correcting a level of said tracking error signal on the basis of a detection result of said spherical aberration detecting portion; and a driving portion for moving the irradiating position of said laser beam in the disc radial direction in accordance with the tracking error signal, the level of which has been corrected by said level correction portion, wherein said spherical aberration detecting portion generates a voltage signal as the detection result of the spherical aberration, and said level correcting portion includes:

a gain control signal generating portion for folding back said voltage signal on the basis of a predetermined reference level to generate a gain control signal; and an amplifying portion for receiving the tracking error signal generated from said tracking error signal generating portion and amplifying the received tracking error signal by an amplification gain corresponding to said gain control signal.

2. An apparatus according to claim 1, wherein the predetermined reference level is about zero.

* * * * *